Patented July 5, 1949

2,475,288

UNITED STATES PATENT OFFICE 2,475,288

FUNGICIDES AND INSECTICIDE

Elbert C. Ladd, Passaic, N. J., assignor to United States Rubber Company, New York, N. Y., a corporation of New Jersey No Drawing. Application September 25, 1944, Serial No. 555,748

9 Claims. (Cl. 167—32)

This invention relates to new and useful improvements in fungicides. The invention further relates to methods of treating plants, and to methods of protecting organic material subject to attack by fungi, as the immunizing of seed, and the mildewproofing of fabrics and other material.

I have found that 4a,5,8,8a-tetrahydronaphthalenediones-1,4 and 5,8-dihydronaphthalenediols-1,4 are effective fungicides. 4a,5,8,8a-tetrahydronaphthalenediones-1,4 may be prepared by the "Diels-Alder reaction" procedure by reacting a conjugated diene with a parabenzoquinone to form by addition a 4a,5,8,8a-tetrahydronaphthalenedione-1,4. The Diels-Alder reaction is discussed by Norton in Chemical Reviews, 31, 319–523 (1942). Examples of conjugated dienes that may be reacted with parabenzoquinones are butadiene-1,3; 2-methyl butadiene-1,3; 2,3-dimethyl butadiene-1,3; 2-chlorobutadiene-1,3; 2-bromobutadiene-1,3; 2-phenyl butadiene-1,3; 2-methyl-2-chlorobutadiene-1,3; cyclopentadiene; methyl pentadiene-1,3; 4-methyl-3-chloropentadiene-1,3; cyclohexadiene-1,3; 4-methyl-3-chlorohexadiene-1,3. Examples of parabenzoquinones that may be reacted with conjugated dienes to give 4a,5,8,8a-tetrahydronaphthalene-diones-1,4 are p-benzoquinone, 2-methyl-p-benzoquinone, 2-chloro-p-benzoquinone; 2,5-dichloro-p-benzoquinone, 2,6-dichloro-p-benzoquinone, trichloro-p-benzoquinone, tetrachloro-p-benzoquinone. The chlorine-substituted conjugated dienes and chlorine-substituted parabenzoquinones give the corresponding chlorine-substituted 4a,5,8,8a-tetrahydronaphthalenediones-1,4 (see Example III below). Another method of obtaining chlorinated 4a,5,8,8a-tetra-hydronaphthalenediones-1,4 is to treat a 4a,5,8,8a-tetrahydronaphthalenedione-1,4 with chlorine (see Example II below). The 5,8-dihydronaphthalenediols-1,4 are prepared by internal rearrangement of the corresponding 4a,5,-8,8a-tetrahydronaphthalenedione-1,4 by treatment with a trace of a hydrogen halide, for example, HBr in acetic acid solution or HCl in ethanol solution, wherein the hydrogens at the 4a and 8a positions migrate to the oxygen at the 1 and 4 positions to give the corresponding 5,8-dihydronaphthalenediols-1,4 (see Example V below). Structurally, the rearrangement of the parent compound may be represented as follows:

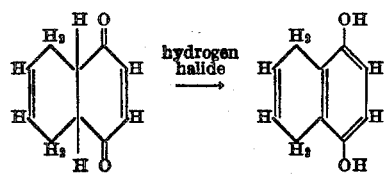

The 4a,5,8,8a-tetrahydronaphthalene-diones-1,4 and 5,8-dihydronaphthalenediols-1,4 may be used as seed protectants and to protect plants, which term includes plant parts, or soil from microorganisms harmful to seeds and plants. They may also be applied to prevent or retard fungus growth and the formation of, for example, mildew on organic material such as rope, wood, fur, hair, feathers, cotton, wool, leather, paints, varnishes, and the like. They may be applied as a dust, undiluted or mixed with a powdered solid carrier, such as clay or talc, or as a spray in a liquid carrier, as in solution in a suitable solvent, or suspended in a suitable non-solvent, for example, water. They may be used admixed with carriers that are active of themselves, for example, other fungicides or bactericides, insecticides, insectifuges, fertilizers, hormones, or buffering agents.

The following examples are given to illustrate the invention:

Example I 5,8-methano-4a,5,8,8a-tetrahydronaphthalenedione-1,4 was prepared by reacting equimolar proportions of cyclopentadiene and p-benzoquinone. The structure of the compound may be represented as follows:

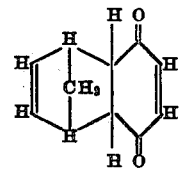

The compound and method of preparing it are described by Albrecht, Ann., 348, 34 (1906) and also by Diels and Alder, Ann., 460, 100 (1928).

Two portions of pea seed, variety Perfection, were tumbled with 1% and .25% by weight respectively of 5,8-methano-4a,5,8,8a-tetrahydronaphthalenedione-1,4 in dust form. The seeds were then planted in soil known to be infested with a number of organisms, including Pythium ultimum. The effectiveness of the chemical as a fungicide was determined by comparing the number of treated seeds which germinated into healthy plants from equal numbers of treated and untreated seeds planted under the same conditions. The viability of the pea seeds used, that is, the fraction of the seed which would normally germinate and grow in sterile soil, was 95%. Observations made at the end of 10 days showed that 70% of the seeds treated with 1% of the chemical and 44% of the seeds treated with .25% of the chemical had germinated and grown into healthy seedlings, whereas only 14% of the untreated seeds germinated and grew. The above illustrates the seed protectant action of the chemical.

In slide tests made on spores of the fungus *Sclerotinia fructicola*, using the "slide technique" described by S. E. A. McCallan et al., Contributions Boyce-Thompson Institute, 4, 233 (1932); 9, 249 (1938); 10, 329 (1939); 12, 49 (1941); 12, 431 (1943), one hundred parts of 5,8-methano-4a,5,8,8a-tetrahydronaphthalenedione-1,4 per million parts of water gave 100% kill of the fungus.

*Example II*

The 5,8-methano-4a,5,8,8a-tetrahydronaphthalenedione-1,4 of Example I was chlorinated to the extent of the introduction of six chlorine atoms, presumably four chlorine atoms by substitution for hydrogen and two by addition at a double bond. The chlorinated 5,8-methano-4a,5,8,8a-tetrahydronaphthalenedione-1,4 was prepared as follows: 20 parts (all parts by weight) of the 5,8-methano-4a,5,8,8a-tetrahydronaphthalenedione-1,4 of Example I having a melting range of 75–77° C. were dissolved in 200 parts of glacial acetic acid and chlorine was passed into the solution with stirring, at ice temperature, until hydrogen chloride ceased to be evolved. After standing overnight at room temperature, the reaction mixture was filtered, and the precipitate was rinsed with cold ethanol and recrystallized from 800 parts of boiling petroleum naphtha fraction having a boiling range from 60° to 80° C. (commercial Skellysolve). Ten parts of snow white crystals having a melting range of 174–175° C. were obtained. The product was soluble in acetone, soluble in benzene, slightly soluble in methanol and ethanol and insoluble in cold Skellysolve. From analysis of the product, the empirical formula $C_{11}C_6O_2Cl_6$ is derived.

Seed protectant tests were made on pea seeds following the procedure described in Example I, but using 1% of the seed weight of the chlorinated 5,8 - methano - 4a,5,8,8a-tetrahydronaphthalenedione-1,4 prepared as above described. The viability of the pea seeds used in this test was between 50% and 70%. Observations made at the end of 10 days showed a 52% stand for the treated seeds and an 11% stand for the untreated seeds.

In slide tests on *Sclerotinia fructicola*, similarly to Example I, five and ten parts of the chlorinated 5,8-methano-4a,5,8,8a-tetrahydronaphthalenedione-1,4 per million parts of water gave 94% and 100% kill of the fungus respectively.

The following illustrates the mildew-proofing action of the chlorinated 5,8-methano-4a,5,8,8a-tetrahydronaphthalenedione-1,4 on cotton fabric. Pieces of cotton fabric were immersed in a 1% by weight solution of the chemical in acetone, until the fabric was completely impregnated with the solution, then air dried to completely remove the acetone. The samples were buried one-fourth inch deep in greenhouse soil heavily infested with naturally occurring cellulose-decomposing organisms. Samples of untreated fabric, and fabric treated only with acetone, were buried at the same time. At the end of two weeks, the samples were examined for mildew growth and their bursting strengths were measured. The untreated fabric and the fabric treated with acetone showed heavy mildew growths and gave bursting strengths of 23 and 33 pounds per square inch respectively, whereas the fabric treated with the chlorinated 5,8-methano-4a,5,8,8a-tetrahydro-naphthalenedione-1,4 showed no mildew growth, and gave a bursting strength of 123 pounds per square inch. The bursting strength of the fabric before treatment was 165 pounds per square inch.

*Example III*

2,3,4a,8a- tetrachloro-5,8 - methano - 4a,5,8,8a-tetrahydronaphthalenedione-1,4 was prepared by reacting equimolar proportions of cyclopentadiene and tetrachloro-p-benzoquinone, following the Diels-Alder reaction procedure. The structure of the compound may be represented as follows:

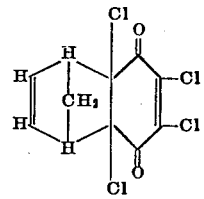

The compound and a method of preparing it are described by Albrecht, Ann., 348, 45 (1906).

Seed protectant tests were made on pea seeds following the procedure described in Example I, but using 1% of the seed weight of 2,3,4a,8a-tetrachloro-5,8-methano - 4a,5,8,8a - tetrahydronaphthalenedione-1,4. The viability of the pea seeds used was 95%. Observations made at the end of 10 days showed a 59% stand for the treated seeds and a 31% stand for the untreated seeds.

In slide tests on *Sclerotinia fructicola*, similarly to Example I, 8 and 16 parts of 2,3,4a,8a-tetrachloro-5,8-methano-4a,5,8,8a - tetrahydronaphthalenedione-1,4 per million parts of water gave 92% and 100% kill of the fungus respectively.

Mildewproofing tests on cotton fabric as in Example II with 2,3,4a,8a-tetrachloro-5,8-methano-4a,5,8,8a-tetrahydronaphthalenedione-1,4 in acetone showed no fungus growth and gave a bursting strength of 122 pounds per square inch, compared with heavy fungus growths on the untreated cotton and the cotton treated with acetone having bursting strengths of 23 and 33 pounds per square inch respectively. The bursting strength of the fabric before treatment was 165 pounds per square inch.

The following illustrates the effectiveness of the chemical as a foliage fungicide. Tomato plants with four to six fully expanded leaves were sprayed for 20 seconds at 20 lbs. per sq. in. with aqueous suspensions (prepared with a small amount of commercial dispersing agent) of 2000 parts, 200 parts and 80 parts per million, respectively, of 2,3,4a,8a-tetrachloro-5,8-methano-4a,-5,8,8a - tetrahydronaphthalenedione - 1,4. After drying overnight in the greenhouse, the treated plants, together with some untreated plants, were sprayed for 20 seconds at 20 lbs. per sq. in. with an aqueous suspension of spores of *Alternaria solani* containing approximately 25,000 spores per cubic centimeter. The plants were then set in an incubation chamber at 75° F. and 100% humidity for 24 hours. The plants were then removed to the greenhouse and held on the greenhouse bench for ten days. The number of lesions were then counted on the leaves of the plants. The average lesions per plant not treated with the chemical was 194. The number of lesions on the plants treated with the suspension of 2000 P. P. M. (parts per million) of the chemical was 12, with 200 P. P. M. was 103, and with 80 P. P. M. was 67. This shows a minimum lethal dose for 95% kill of the fungus on foliage of 2000 parts of the chemical per million of water.

The 2,3,4a,8a-tetrachloro-5,8-methano-4a,5,8,-8a-tetrahydronaphthalenedione-1,4 is also especially effective as an insecticide (including arachnicide) as shown in the following Examples III (a), III (b) and III (c):

Example III(a)

Leaves of Vicia fabae (broad bean) infested with 24 to 61 pea aphids (Macrosiphum pisi) per leaf, were sprayed with a .5% aqueous suspension of 2,3,4a,8a-tetrachloro-5,8-methano-4a,5,8,8a-tetrahydronaphthalenedione-1,4 in water containing .05% Emulphor EL (believed to be the reaction product of a fatty acid or fatty acid ester with ethylene oxide) which is a well known surface-active dispersing agent. After 24 hours 57% of the aphids on the treated leaves had died, whereas the mortality of the aphids on untreated check leaves was only 2% in this period of time. It had been determined that untreated leaves could be used as checks since the Emulphor EL in the aqueous suspension had no effect on the aphids.

Example III(b)

This case illustrates the arachnicidal properties of the 2,3,4a,8a-tetrachloro-5,8-methano-4a,5,8,-8a-tetrahydronaphthalenedione-1,4. Leaves of pinto bean infested with 34 to 70 red spider mites per leaf were sprayed with a .5% aqueous suspension of 2,3,4a,8a-tetrachloro-5,8-methano-4a,5,8,8a-tetrahydronaphthalenedione-1,4 in water containing .05% Emulphor EL as a dispersing agent. Observations after 24 hours showed a mortality of 74% of the mites on the treated leaves as compared to a mortality of only 3% on untreated leaves.

Example III (c)

The repellent properties of 2,3,4a,8a-tetrachloro-5,8-methano-4a,5,8,8a - tetrahydronaphthalenedione-1,4 are shown by the following test:

Two young bean plants, the first true leaves fully expanded, were sprayed in amount sufficient to wet the entire leaf surfaces with a ½% aqueous dispersion of 2,3,4a,8a-tetrachloro-5,8-methano-4a,5,8,8a-tetrahydronaphthalenedione - 1,4 containing a small amount of Nacconal NR (a surface-active dispersing agent which is the sulphonated condensation product of chlorinated kerosene with benzene) as a dispersing agent. The plants were then placed in an insect cage and infested with 10 Mexican bean beetle larvae. After six days it was observed that only 5 to 15% of the leaves had been consumed by the insects. Leaves of plants sprayed only with water containing a small amount of Nacconal NR and similarly infested with Mexican bean beetle larvae were completely skeletonized in the same period of time.

Example IV 4a,5,8,8a-tetrahydronaphthalenedione-1,4, the parent compound, was prepared by reacting equimolar proportions of butadiene-1,3 and p-benzoquinone. The structure of the compound may be represented as follows:

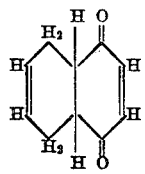

The compound and a method of preparing it are described by Diels and Alder, Ber., 62B, 2361 (1929).

In slide tests on Sclerotinia fructicola, similarly to Example I, 500 parts of 4a,5,8,8a-tetrahydronaphthalenedione-1,4 per million parts of water gave 100% kill of the fungus. This concentration is not necessarily as low as the minimum dosage required to give 100% of ungerminated spores.

The following test shows the effectiveness of 4a,5,8,8a - tetrahydronaphthalenedione - 1,4 against the fungus Chaetomium globosum on cotton textiles. Cotton fabric was immersed in a 1% (by weight) solution of 4a,5,8,8a-tetrahydronaphthalenedione-1,4 in acetone for a time sufficient to completely impregnate the fabric with the solution. The fabric was removed and allowed to air dry to completely volatilize the acetone. It was then inoculated with a Chaetonium globosum spore suspension and incubated in agar medium for 24 days. During this time no fungus growth appeared on the fabric. On the other hand, cotton fabric which received no treatment or which was treated only with acetone, and was then inoculated and incubated with the same fungus under the same conditions, showed heavy growth of fungus within the same period of time.

Example V 5,8-dihydronaphthalenediol-1,4 was prepared from the 4a,5,8,8a-tetrahydronaphthalenedione-1,4 of Example IV by treatment with a trace of HBr in ethanol solution as described above. This compound and a method of preparing it by rearrangement of the corresponding tetrahydrodione are described by Diels and Alder in Ber., 62B, 2362 (1929).

In slide tests on Sclerotinia fructicola, similarly to Example I, 500 parts of 5,8-dihydronaphthalenediol-1,4 per million parts of water gave 100% kill of the fungus. This concentration is not necessarily as low as the minimum dosage required to give 100% of ungerminated spores.

In test against the fungus Chaetomium globosum on cotton fabric similarly to the test in Example IV on the parent compound, 5,8-dihydro-naphthalenediol-1,4, no fungus appeared on the fabric treated with the chemical and then inoculated and incubated for 24 days, whereas the cotton fabrics not treated with the chemical showed heavy fungus growth under the same conditions.

Having thus described my invention, what I claim and desire to protect by Letters Patent is:

1. A fungicidal composition comprising an aqueous suspension of a 4a,5,8,8a-tetrahydronaphthalenedione-1,4, said aqueous suspension containing a dispersing agent.

2. A fungicidal and insecticidal composition comprising an aqueous suspension of 2,3,4a,8a-tetrachloro-5,8-methano - 4a,5,8,8a - tetrahydronaphthalenedione-1,4, said aqueous suspension containing a dispersing agent.

3. A fungicidal composition comprising an aqueous suspension of a chlorinated 5,8-methano-4a,5,8,8a - tetrahydronaphthalenedione - 1,4, said aqueous suspension containing a dispersing agent.

4. A fungicidal composition comprising a 4a,5,-8,8a-tetrahydronaphthalenedione-1,4 and a surface active dispersing agent.

5. A fungicidal composition comprising a chlorinated 5,8-methano-4a,5,8,8a-tetrahydronaphthalenedione-1,4 and a surface active dispersing agent.

6. A fungicidal and insecticidal composition comprising 2,3,4a,8a-tetrachloro - 5,8 - methano-4a,5,8,8a-tetrahydronaphthalenedione-1,4 and a surface active dispersing agent.

7. A fungicidal composition comprising a 4a,5,-8,8a-tetrahydronaphthalenedione-1,4 and a surface active dispersing agent and a powdered solid carrier.

8. A fungicidal composition comprising a chlorinated 5,8-methano-4a,5,8,8a-tetrahydronaphthalenedione-1,4 and a surface active dispersing agent and a powdered solid carrier.

9. A fungicidal and insecticidal composition comprising 2,3,4a,8a-tetrachloro - 5,8 - methano-4a,5,8,8a-tetrahydronaphthalenedione-1,4 and a surface active dispersing agent and a powdered solid carrier.

ELBERT C. LADD.

REFERENCES CITED

The following references are of record in the file of this patent:

UNITED STATES PATENTS

| Number | Name | Date |
| --- | --- | --- |
| 2,348,976 | Hyman | May 16, 1944 |
| 2,349,771 | ter Horst | May 23, 1944 |
| 2,368,667 | Ladd | Feb. 6, 1945 |

OTHER REFERENCES

Ind. and Eng. Chem., Dec. 1943, vol. 35, pages 1255–1259, by ter Horst et al.
Ann., 348, 34, 45 (1906) by Albrecht.
Ann., 460, 100 (1928), by Diels-Alder.
Ber., 62B, 2361 (1929), by Diels-Alder.
Ber., 62B, 2362 (1929), by Diels-Alder. (Copies in Patent Office Library.)